Reissued Apr. 11, 1939 Re. 21,047

UNITED STATES PATENT OFFICE 21,047

PROCESS OF MAKING FERRO-ALLOYS AND OF MAKING ALLOY STEELS FROM SUCH ALLOYS AND IN COMPOSITIONS FOR USE IN SUCH PROCESSES

Ben F. Hardesty, Scarborough, N. Y., assignor, by mesne assignments, to Ferro-Alloy Incorporated, Pittsburgh, Pa., a corporation of Delaware No Drawing. Original No. 2,071,339, dated February 23, 1937, Serial No. 586,699, January 14, 1932. Renewed January 13, 1936. Application for reissue February 21, 1939, Serial No. 257,769

11 Claims. (Cl. 75—54)

The present invention relates to improvements in methods of refining ferro-alloys and alloy steels and has for its principal object the production of ferro-alloys and alloy steels of increased purity and homogeneity.

The production of many alloy steels is, according to the present practice, effected by introducing into the ferrous bath the ferro-alloys of the alloying metals such as chromium, molybdenum, manganese, tungsten, and others. Many of these ferro-alloys are produced by the reduction of the ore concentrates of the alloying metal in the electric furnace in the presence of carbon. The ferro-alloys so produced, however, are not definite homogeneous compounds but rather are heterogeneous in character and contain undissociable carbides, unreduced oxides and gangue products. Moreover, many of these carbides have higher melting points than the temperature of the ferrous bath to which they are added. In such cases, these carbides when introduced into the ferrous metal remain undecomposed and are segregated in areas in the finished steel and thereby constitute a serious detriment thereto.

A most important application of my invention is to steels containing chromium, particularly chrome nickel alloy steels, usually designated stainless steels and containing roughly 20% chromium and 10% nickel. At present the production of stainless steels entails special difficulties which are reflected in the present high cost of stainless steel, particularly the rolled and drawn varieties. As ordinarily produced, stainless steel contains sufficient impurities, chiefly the carbides mentioned, unreduced oxides and probably nitrides, as to account for these difficulties in the cold working of the metal. By reducing the impurities, my invention makes possible the production of stainless rolled sheet steel at greatly reduced cost. Moreover, on account of the purity and resulting ductility of the metal it may, in many instances, be subjected to both hot and cold working without the necessity of annealing.

The invention consists in the treatment of the metal bath with a barium compound of the type liberating oxygen. The barium compound most preferred by me is the peroxide since the barium monoxide component thereof energetically forms with the impurities of the bath low melting point and low viscosity slags, whereas the excess oxygen component furnishes available oxygen to oxidize certain of the impurities and thus cause them to readily dissolve in the slag. Furthermore, some of the carbon is oxidized thereby forming carbon monoxide which sweeps through the bath and exerts a beneficial scavenging action. A further oxy salt of barium which is available is barium carbonate. In the use of this salt the following reactions are believed to take place:

When barium carbonate is heated to temperatures within those prevailing in a ferrous metal bath, carbon dioxide is liberated with the formation, first, of the compound $BaO, 2BaCO_3$, and then, upon further loss of carbon dioxide, the compound $2BaO,BaCO_3$ is formed which does not yield further quantities of $CO_2$. Both compounds $BaO, 2BaCO_3$ and $2BAO, BaCO_3$ are highly fusible and basic and react with the ferrous and non-ferrous impurities to produce agglomerated compounds of low melting point which are therefore readily removable.

For many purposes it may be desirable to add to the bath a mixture of the peroxide and the carbonate since the melting point of the mixture is somewhat lower than that of the components and the basic carbonates formed act as a flux for the barium monoxide formed of the peroxide added.

As a preferred example of a mixture which may be employed, but without limiting the invention thereto, I give the following:

| | Parts |
|---|---|
| Barium peroxide | 150 |
| Barium carbonate | 50 |

A specific example of the process employed using the above mixture is as follows:

To the molten bath of ferrochromium, as, for example, an alloy containing approximately 75% chromium, 25% iron, .12 to .20% carbon, I add from twenty to forty pounds of the mixture of barium peroxide and barium carbonate above given, per ton of metal, it being understood that this quantity of the mixture is susceptible to a fairly wide variation. After the metal becomes quiet, it is ready to be added to the metal to be alloyed. Previous to this the bath of carbon steel is prepared as by melting sheet and bar scrap, and adding thereto from twenty to forty pounds of the above mentioned barium mixture per ton of metal, this having the same effect of clearing the carbon steel bath of impurities. I then introduce into the bath the purified ferrochrome alloy, and after sufficient time has elapsed for the ingredients to become mixed the bath is then preferably treated again with the barium peroxide mixture in order to eliminate any impurities which have been acquired by the previous operation, whereupon the bath is ready for the addition of the nickel ingredient after which the metal may be poured.

In lieu of first purifying the ferroalloy separately, I may use an ordinary unpurified ferroalloy and rely upon the purification treatment in the alloy steel bath to effect the necessary purification. This requires a somewhat more strenuous treatment in which larger quantities of the purifying agent are used, and in such case at least two treatments with the barium mixture are advisable.

It is, of course, immaterial so far as the character of the finished product is concerned, whether the purification of the ferroalloy is carried out in the same plant simultaneously with the melting of the steel lacking the alloy element or whether these operations are performed at different points and the thus previously purified alloy furnished the steel maker. Furthermore, in the manufacture of the purified ferroalloy the treatment with the barium salts will be carried out irrespective of the manner in which the alloy has been produced, i. e., whether directly from the ore or not.

It has been found that the barium salts hasten the melting of the steel, and I therefore prefer to add the treating agent to the carbon steel, for example, before the melting is completed. The final treatment with the barium salts may take place either in the furnace or in the ladle.

Among the advantages resulting from my improvement may be mentioned the following: Alloy steels produced in accordance with my invention have demonstrated superior physical properties as a result of the cleaner metal which has been produced. Not only are the physical impurities, such as carbides, nitrides and dissolved slag, eliminated from the metal but dissolved gases are eliminated from the bath to a substantial degree whereby ingots are produced which are free from pipes and blow holes. Since fewer impurities are in the bath to start with, and since such as are present in the bath are more quickly removed, the period of heat is greatly reduced with consequent saving of cost. Moreover, because of the shorter time of heating much less of the alloying element, as for example, chromium, is lost from the bath whereby the composition of the poured metal can be gaged with sufficient accuracy from the known composition and amount of the ingredients added to the bath, and the necessity eliminated for analyses of the metal during the heat which latter in such a case must be held until a report can be had on such analyses.

While I have described in detail the manufacture of a chrome nickel steel in accordance with my invention, it will be understood that the manufacture of other alloy steels as molybdenum, vanadium, manganese, tungsten, and others, will be carried out similarly. I also wish it understood that the specific proportions given of the ingredients of the treating agent may be varied considerably to suit different starting materials and to alter the effects of the treatment somewhat. Thus, by increasing the amount of barium peroxide, a decrease in the amount of carbon in the steel is brought about through the oxidizing effect of the excess oxygen upon the carbon.

I claim:

1. The process of making alloy steel which consists in adding to the steel in molten condition a mixture composed substantially of barium peroxide and barium carbonate, the amount of barium peroxide being substantially in excess of the amount of barium carbonate.

2. The process of making alloy steel which consists in adding to the steel in molten condition a mixture composed substantially of barium peroxide and barium carbonate in the proportion of approximately three parts of the former to one part of the latter.

3. The process of making stainless chrome steel which consists in adding to the molten bath a mixture comprised essentially of barium peroxide and barium carbonate, the amount of barium peroxide being substantially in excess of the amount of barium carbonate.

4. The process of making stainless chrome steel which consists in adding to the molten bath, shortly before pouring, a mixture comprised essentially of barium peroxide and barium carbonate, the amount of barium peroxide being substantially in excess of the amount of barium carbonate.

5. The process of refining stainless chrome steel which consists in adding to the steel in the ladle shortly before pouring a mixture comprising essentially barium peroxide and barium carbonate, the amount of barium peroxide being substantially in excess of the amount of barium carbonate.

6. The process of refining stainless chrome steel which consists in adding to the steel in the ladle shortly before pouring from twenty to forty pounds per ton of metal of a mixture comprising essentially three parts of barium peroxide and one part of barium carbonate.

7. In the process of making alloy steels consisting in preparing a bath of steel lacking an alloy element and in preparing a separate bath of a ferroalloy of said element and then combining said baths, the steps which consists in treating both said baths with a mixture comprising essentially barium carbonate and barium peroxide.

8. The process according to the preceding claim including also the step of treating the final bath with said mixture of barium carbonate and barium peroxide.

9. A composition of matter for use in refining molten ferroalloys and alloy steels comprising a mixture of barium peroxide and barium carbonate in which the peroxide is substantially in excess of the carbonate.

10. A composition of matter for use in refining molten ferroalloys and alloy steels comprising a mixture of barium peroxide and barium carbonate containing an excess of said peroxide, the composition being capable, when contacted with the ferroalloy or alloy steel, of liberating oxygen and forming basic barium carbonate, and having a melting point lower than the melting points of the carbonates of the mixture.

11. A composition of matter for use in purifying molten ferroalloys and alloy steels, comprising a mixture of about three parts of barium peroxide and one part of barium carbonate.

BEN F. HARDESTY.

CERTIFICATE OF CORRECTION.

Reissue No. 21,047. April 11, 1939.

BEN F. HARDESTY.

It is hereby certified that the name of the assignee in the above numbered patent was erroneously described and specified as "Ferro-Alloy Incorporated" whereas said name should have been described and specified as Ferro-Alloys Incorporated, of Pittsburgh, Pennsylvania, a corporation of Delaware, as shown by the record of assignments in this office; and that the said Letters Patent should be read with this correction therein that the same may conform to the record of the case in the Patent Office.

Signed and sealed this 30th day of May, A. D. 1939.

Henry Van Arsdale (Seal) Acting Commissioner of Patents.